United States Patent
Huang et al.

(10) Patent No.: US 10,218,389 B2
(45) Date of Patent: Feb. 26, 2019

(54) TRANSMITTER

(71) Applicant: HUAWEI TECHNOLOGIES CO., LTD., Shenzhen (CN)

(72) Inventors: Wei Huang, Shenzhen (CN); Xiang Feng, Chengdu (CN); Qian Yin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/857,650

(22) Filed: Dec. 29, 2017

(65) Prior Publication Data

US 2018/0123617 A1    May 3, 2018

Related U.S. Application Data

(63) Continuation of application No. PCT/CN2016/087952, filed on Jun. 30, 2016.

(30) Foreign Application Priority Data

Jun. 30, 2015  (CN) .......................... 2015 1 0373246

(51) Int. Cl.
*H04B 1/00*   (2006.01)
*H04B 1/04*   (2006.01)
(Continued)

(52) U.S. Cl.
CPC .............. *H04B 1/005* (2013.01); *H01Q 5/30* (2015.01); *H04B 1/04* (2013.01); *H04B 1/406* (2013.01)

(58) Field of Classification Search
CPC .......... H04B 1/04; H04B 1/005; H04B 1/406; H01Q 5/30
See application file for complete search history.

(56) References Cited

U.S. PATENT DOCUMENTS 8,380,144 B1    2/2013  Bai et al.
2004/0179587 A1    9/2004  Kenington et al.
(Continued)

FOREIGN PATENT DOCUMENTS

CN    1870614 A    11/2006
CN    102014090 A    4/2011
(Continued)

OTHER PUBLICATIONS

Haiying Cao et al, "Digital Predistortion for High Efficiency Power Amplifier Architectures Using a Dual-Input Modeling Approach", IEEE Transactions on Microwave Theory and Techniques, vol. 60, No. 2, Feb. 2012, 9 pages.

*Primary Examiner* — Raymond Dean
(74) *Attorney, Agent, or Firm* — Kilpatrick Townsend & Stockton LLP

(57) ABSTRACT

Embodiments of the present invention provide a transmitter. The transmitter includes: a dual-band input circuit including at least two band input ends, performing DPD processing on an input baseband signal, and outputting the baseband signal; a modulo circuit, performing modulo processing on the input baseband signal, and outputting the baseband signal; a signal decomposition circuit, receiving the baseband signal input by the dual-band input circuit and a baseband signal modulus value input by the modulo circuit, and performing decomposition to obtain multiple decomposed signals; a modulation circuit, receiving the multiple decomposed signals, performing processing, modulating two signals obtained after processing to corresponding working frequencies, and outputting the two signals to a dual-band power amplifier. In comparison with a single-input dual-band power amplifier, when a dual-input dual-band power amplifier transmits signals in two bands con-
(Continued)

currently, overall transmission efficiency of a dual-band transmitter can be obviously improved.

14 Claims, 5 Drawing Sheets

(51) Int. Cl.
  *H01Q 5/30* (2015.01)
  *H04B 1/403* (2015.01)

(56) References Cited

U.S. PATENT DOCUMENTS

| | | |
|---|---|---|
| 2008/0095264 A1 | 4/2008 | Deng et al. |
| 2008/0111622 A1 | 5/2008 | Sperlich et al. |
| 2013/0064325 A1 | 3/2013 | Kilambi et al. |
| 2015/0085634 A1 | 3/2015 | Yu et al. |
| 2015/0304068 A1 | 10/2015 | Xiong et al. |
| 2016/0142022 A1 | 5/2016 | Wang et al. |

FOREIGN PATENT DOCUMENTS

| | | |
|---|---|---|
| CN | 103023842 A | 4/2013 |
| CN | 103314523 A | 9/2013 |
| CN | 103891137 A | 6/2014 |
| CN | 104348772 A | 2/2015 |
| CN | 104580044 A | 4/2015 |
| CN | 104639481 A | 5/2015 |
| CN | 104980174 A | 10/2015 |
| EP | 2254239 A1 | 11/2010 |
| KR | 101122911 B1 | 2/2012 |
| KR | 20140143459 A | 12/2014 |
| WO | 2013007188 A1 | 1/2013 |
| WO | 2014141335 A1 | 9/2014 |

TRANSMITTER

CROSS-REFERENCE TO RELATED APPLICATIONS

This application is a continuation of International Application No. PCT/CN2016/087952, filed on Jun. 30, 2016, which claims priority to Chinese Patent Application No. 201510373246.8, filed on Jun. 30, 2015, The disclosures of the aforementioned applications are hereby incorporated by reference in their entireties.

TECHNICAL FIELD

The present invention relates to the field of communications technologies, and more specifically, to a transmitter.

BACKGROUND

With development of a 3G/4G communications technology, higher-order modulation multi-carrier transmitters are widely applied to a 3G/4G network. A power radio frequency amplifier is designed to have highest power consumption in a transmitter, is one of most important components, and determines reliability and heat consumption of a base station. Therefore, much attention needs to be paid to the power radio frequency amplifier.

At present, there are many types of transmitters on the market. A structure of a single-input multi-band transmitter is shown in FIG. 1, including: DPD (digital pre-distortion, digital pre-distortion) components, DUC (digital up-conversion, digital up-conversion) components, an adder, a DAC (digital-analog convertor, digital-to-analog converter), AQM (analog quadrate modulation, analog quadrate modulation) components, and a single-input dual-band PA (power amplifier, power amplifier). A basic structure of a multi-input single-band transmitter is shown in FIG. 2, including: a DPD component, a signal decomposition circuit, DACs, AQM, and a dual-input single-band PA. A dual-input dual-band PA may be considered as a dual-input single-band PA when independently transmitting a signal in one band.

In the prior art, a dual-input dual-band PA has a problem of selecting a decomposition path, because for the dual-input dual-band PA, one output may have multiple corresponding input signal combinations. That is, there are different paths for one output, and different paths have different impact on performance of the PA. When the dual-input dual-band PA is used as a dual-input single-band PA (an optimal decomposition path when a signal in one band is independently transmitted), because two bands are different, a transmit signal in the other band directly affects efficiency of the power amplifier in the band and the like.

As can be learned, when a dual-input dual-band PA transmits signals in bands concurrently, how to enable the power amplifier to work normally and maintain relatively high efficiency is a problem that currently needs to be resolved.

SUMMARY

In a first aspect of embodiments in accordance with the present disclosure, a transmitter includes: a dual-band input circuit, a modulo circuit, a signal decomposition circuit, a modulation circuit, and a dual-band power amplifier, where the dual-band input circuit includes a first band input end, a second band input end, and two digital pre-distortion DPD components connected to the first band input end and the second band input end, and is configured to output a first baseband signal input by the first band input end and a second baseband signal input by the second band input end, where the first baseband signal and the second baseband signal are processed by the DPD components before being output;

the modulo circuit is configured to: perform modulo processing on the first baseband signal and the second baseband signal that are input, and output a corresponding first baseband signal modulus value and a corresponding second baseband signal modulus value;

the signal decomposition circuit includes a memory storing a lookup table, and a multiplier, and is configured to: receive the first baseband signal and the second baseband signal that are input by the DPD components, and the first baseband signal modulus value and the second baseband signal modulus value that are from the modulo circuit, and separately perform signal decomposition processing based on the lookup table and the multiplier to obtain multiple decomposed signals; and the modulation circuit is connected to the signal decomposition circuit, receives the multiple decomposed signals output by the signal decomposition circuit, performs combination processing on the multiple decomposed signals to obtain two corresponding processed signals, modulates the two processed signals to corresponding working frequencies, and outputs the two processed signals to the dual-band power amplifier.

In a first implementation of a first aspect of embodiments in accordance with the present disclosure, the modulo circuit includes two modulo units, respectively connected to the first band input end and the second band input end, and configured to respectively perform modulo processing on the first baseband signal input by the first band input end and the second baseband signal input by the second band input end, to obtain the corresponding first baseband signal modulus value and the corresponding second baseband signal modulus value; or respectively connected to output ends of the DPD components, and configured to perform modulo processing on the first baseband signal and the second baseband signal that are processed by the DPD components, to obtain the corresponding first baseband signal modulus value and the corresponding second baseband signal modulus value that are processed by the DPD components.

In a second implementation of the first aspect of the embodiments in accordance with the present disclosure, in the signal decomposition circuit, the lookup table stored in the memory is a two-dimensional lookup table 2DLUT, four such 2DLUTs being stored in the memory, the first baseband signal modulus value and the second baseband signal modulus value are input to each 2DLUT, a quantity of the multipliers is the same as a quantity of the 2DLUTs, and an input of each multiplier is an output of each 2DLUT; and the signal decomposition circuit is configured to: receive the first baseband signal and the second baseband signal that are input by the two DPD components, for the first baseband signal and the second baseband are input by each of the two DPD components, multiply, the first baseband signal by an output of one of the 2DLUTs by using one of the multipliers and multiply the second baseband signal by an output of another one of the 2DLUTs by using another one of the multipliers, to obtain a first signal, a second signal, a third signal, and a fourth signal, and output the first signal, the second signal, the third signal, and the fourth signal to the modulation circuit, where the first baseband signal and the second baseband signal are input into an input end of the same DPD component, and the first baseband signal and the second baseband signal that have been processed by the DPD component are separately output at an output end.

In a third implementation of the first aspect of the embodiments in accordance with the present disclosure, the transmitter further includes: an adder connected to the modulo circuit, where the adder is configured to use outputs of the two modulo units in the modulo circuit as inputs, to obtain a sum of the first baseband signal modulus value and the second baseband signal modulus value that are obtained after modulo processing performed by the modulo circuit;

in the signal decomposition circuit, the lookup table stored in the memory is a one-dimensional lookup table 1DLUT, there are four such 1DLUTs in the memory, a quantity of the multipliers is the same as a quantity of the 1DLUTs, and when an input of each multiplier is an output of the 1DLUT, an input of each 1DLUT is the sum of the first baseband signal modulus value and the second baseband signal modulus value that is output by the adder; and the signal decomposition circuit is configured to: receive the first baseband signal and the second baseband signal that are input by the two DPD components, for the first baseband signal and the second baseband are from each of the two DPD components, multiply, the first baseband signal by an output of one of the 2DLUTs by using one of the multipliers and multiply the second baseband signal by an output of another one of the 2DLUTs by using another one of the multipliers, to obtain a first signal, a second signal, a third signal, and a fourth signal, and output the first signal, the second signal, the third signal, and the fourth signal to the modulation circuit, where the first baseband signal and the second baseband signal are input into an input end of the same DPD component, and the first baseband signal and the second baseband signal that have been processed by the DPD component are separately output at an output end.

In a fourth implementation of the first aspect of the embodiments in accordance with the present disclosure, the modulation circuit includes: four digital up-conversion DUC components having input ends being separately connected to the signal decomposition circuit, two adders cross-connected to the DUCs (DUC components), digital-to-analog converters DACs connected to the adders, and analog quadrature modulation AQM components connected to the DACs; and the modulation circuit is configured to: perform one-to-one up-conversion on the first signal and the second signal by using two of the DUCs to change frequencies of the first signal and the second signal to fc_bandA; perform one-to-one up-conversion on the third signal and the fourth signal by using the other two DUCs to change frequencies of the third signal and the fourth signal to fc_bandB; separately add, by using the adders cross-connected to the DUCs, the up-conversion processed first signal to the up-conversion processed third signal, and the up-conversion processed second signal to the up-conversion processed fourth signal, to obtain a first added signal and a second added signal, where digital-to-analog conversion is separately performed on the first added signal and the second added signal by using DACs connected to respective adders; and separately modulate, by means of AQM, the first added and digital-to-analog converted signal and the second added and digital-to-analog converted signal to corresponding radio frequency working frequencies, and input the first added signal and the second added signal to the dual-input dual-band power amplifier.

In a fifth implementation of the first aspect of the embodiments in accordance with the present disclosure, in the signal decomposition circuit, the lookup table stored in the memory is a two-dimensional lookup table 2DLUT, there are three such 2DLUTs in the memory, the first baseband signal modulus value and the second baseband signal modulus value are input to each 2DLUT, two of the 2DLUTs are connected to one multiplier each, and an input of each multiplier is an output of each 2DLUT; and the signal decomposition circuit is configured to: use an output of the 2DLUT not connected to a multiplier as a fifth signal, directly output the fifth signal to the modulation circuit, receive the first baseband signal and the second baseband signal that are input by the DPD components and that are combined into one signal, for each signal combined and from each of the DPD components, multiply, by the output of one of the 2DLUTs connected to one of the multipliers, the signal into which the first baseband signal and the second baseband signal are combined, to obtain a sixth signal and a seventh signal, and output the sixth signal and the seventh signal to the modulation circuit.

In a sixth implementation of the first aspect of the embodiments in accordance with the present disclosure, in the signal decomposition circuit, the lookup table stored in the memory is a two-dimensional lookup table 2DLUT, there is one such 2DLUT in the memory, and the first baseband signal modulus value and the second baseband signal modulus value are input to the 2DLUT; and the signal decomposition circuit is configured to: use an output of the 2DLUT as a fifth signal, directly output the fifth signal to the modulation circuit, receive the first baseband signal and the second baseband signal that are input by the DPD components and that are combined into one signal, for each signal combined and from each of the DPD components, multiply, by using the multiplier, the received first baseband signal modulus value and second baseband signal modulus value by the signal into which the first baseband signal and the second baseband signal are combined, to obtain a sixth signal and a seventh signal, and output the sixth signal and the seventh signal to the modulation circuit.

In a seventh implementation of the first aspect of the embodiments in accordance with the present disclosure, the transmitter further includes: an adder connected to the modulo circuit, where the adder is configured to use outputs of the two modulo units in the modulo circuit as inputs, to obtain a sum of the first baseband signal modulus value and the second baseband signal modulus value obtained after modulo processing performed by the modulo circuit;

in the signal decomposition circuit, the lookup table stored in the memory is a one-dimensional lookup table 1DLUT, there are three such 1DLUTs in the memory, a sum of the first baseband signal modulus value and the second baseband signal modulus value that is output by the adder is input to each 1DLUT, two of the 1DLUTs are connected to one multiplier each, and an input of each multiplier is an output of the 1DLUT; and the signal decomposition circuit is configured to: use an output of the 1DLUT not connected to a multiplier as a fifth signal, directly output the fifth signal to the modulation circuit, receive the first baseband signal and the second baseband signal that are input by the DPD components and that are combined into one signal, for each signal combined and from each of the DPD components, multiply, by the output of one of the 1DLUTs connected to the multipliers, the signal into which the first baseband signal and the second baseband signal are combined, to obtain a sixth signal and a seventh signal, and output the sixth signal and the seventh signal to the modulation circuit.

In an eighth implementation of the first aspect of the embodiments in accordance with the present disclosure, the transmitter further includes: an adder connected to the modulo circuit, where the adder is configured to use outputs of the two modulo units in the modulo circuit as inputs, to obtain a sum of the baseband signal modulus values obtained after modulo processing performed by the modulo circuit;

in the signal decomposition circuit, the lookup table stored in the memory is a one-dimensional lookup table 1DLUT, there is one such 1DLUT in the memory, and a sum of the first baseband signal modulus value and the second baseband signal modulus value that is output by the adder is input to the 1DLUT; and the signal decomposition circuit is configured to: use an output of the 1DLUT as a fifth signal, directly output the fifth signal to the modulation circuit, receive the first baseband signal and the second baseband signal that are input by the DPD components and that are combined into one signal, for each signal combined and from each of the DPD components, multiply, by using the multiplier, the received first baseband signal modulus value and second baseband signal modulus value by the signal into which the first baseband signal and the second baseband signal are combined, to obtain a sixth signal and a seventh signal, and output the sixth signal and the seventh signal to the modulation circuit.

In a ninth implementation of the first aspect of the embodiments in accordance with the present disclosure, the modulation circuit includes: a DAC directly connected to an end of the memory storing the lookup table not connected to the multiplier in the signal decomposition circuit, two DUC components respectively connected to output ends of two multipliers in the signal decomposition circuit, an adder connected to the two DUCs, the other DAC connected to the adder, and an AQM component connected to the other DAC, where the lookup table includes a 1DLUT or a 2DLUT; and the modulation circuit is configured to: input, to the dual-band power amplifier, an envelope signal output by the DAC directly connected to the signal decomposition circuit, perform up-conversion on the sixth signal by using the DUC component to change a frequency of the sixth signal to fc_bandA, perform up-conversion on the seventh signal by using the other DUC component to change a frequency of the seventh signal to fc_bandB, add, by using the adder, the seventh signal on which up-conversion processing has been performed to the sixth signal on which up-conversion processing has been performed to obtain a third added signal, perform digital-to-analog conversion on the third added signal by using the DAC connected to the adder, modulate the third added signal obtained after conversion to a corresponding radio frequency working frequency by using the AQM component, and input the third added signal to the dual-band power amplifier.

As can be learned according to the foregoing solutions, the embodiments in accordance with the present disclosure provide a transmitter. The transmitter includes: a dual-band input circuit, a modulo circuit, a signal decomposition circuit, a modulation circuit, and a dual-band power amplifier. The dual-band input circuit includes at least two band input ends and DPDs (DPD components) respectively connected to the two band input ends. The dual-band input circuit is connected to the signal decomposition circuit, and outputs baseband signals input by the two band input ends, where the baseband signals are processed by the DPDs before being output. The modulo circuit performs modulo processing on the input baseband signals, and outputs corresponding baseband signal modulus values. The signal decomposition circuit includes a memory storing a lookup table, and a multiplier. The signal decomposition circuit receives the baseband signals in two bands that are input by the dual-band input circuit, and the baseband signal modulus values input by the modulo circuit, and performs decomposition to obtain multiple decomposed signals after decomposition. The modulation circuit is connected to the signal decomposition circuit, receives the multiple decomposed signals output by the signal decomposition circuit, processes the multiple decomposed signals to obtain two processed signals, modulates the two processed signals to corresponding working frequencies, and outputs the two processed signals to the dual-band power amplifier. The dual-band dual-input power amplifier transmitter disclosed in the embodiments in accordance with the present disclosure introduces a multi-input single-band power amplifier to a dual-band scenario by using the foregoing circuit architecture. In comparison with a single-input dual-band power amplifier, when the dual-input dual-band power amplifier transmits signals in two bands concurrently, the power amplifier can work normally and maintain relatively high efficiency.

BRIEF DESCRIPTION OF DRAWINGS

To describe the technical solutions in the embodiments of the present invention or the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

In the specification, claims, and accompanying drawings, the terms "first", "second", "third", "fourth", and so on (if existent) are intended to distinguish between similar parts but do not necessarily indicate a specific order or sequence. It should be understood that, data used in this way is exchangeable in a proper case, so that the embodiments in accordance with the present disclosure that are described herein can be implemented in another order except those shown or described herein.

DESCRIPTION OF EMBODIMENTS

Full names and Chinese explanations of English abbreviations used in the embodiments in accordance with the present disclosure are described below:

DPD component: digital pre-distortion, digital pre-distortion component;

DUC component: digital up-conversion, digital up-conversion component;

DAC: digital-analog convertor, digital-to-analog converter;

AQM: analog quadrate modulation, analog quadrate modulation; and

PA: power amplifier, power amplifier.

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

As can be learned according to the background, a dual-input dual-band power amplifier has a problem of selecting a decomposition path, and in the prior art, there is no transmitter of a dual-input dual-band power amplifier architecture. Therefore, in a process of transition from a single band to two bands, when a dual-input dual-band power amplifier transmits signals concurrently, it is difficult to ensure overall transmission efficiency of a dual-band transmitter. Therefore, the embodiments provide a dual-band dual-input power amplifier transmitter. The transmitter introduces a multi-input single-band power amplifier to a dual-band scenario by constructing a circuit architecture of the dual-band dual-input power amplifier transmitter. Therefore, when a dual-input dual-band power amplifier transmits signals in two bands concurrently, the power amplifier can work normally and maintain relatively high efficiency. The specific architecture and implementation process are described in detail by using the following specific embodiments.

Embodiment 1

Figure 1:
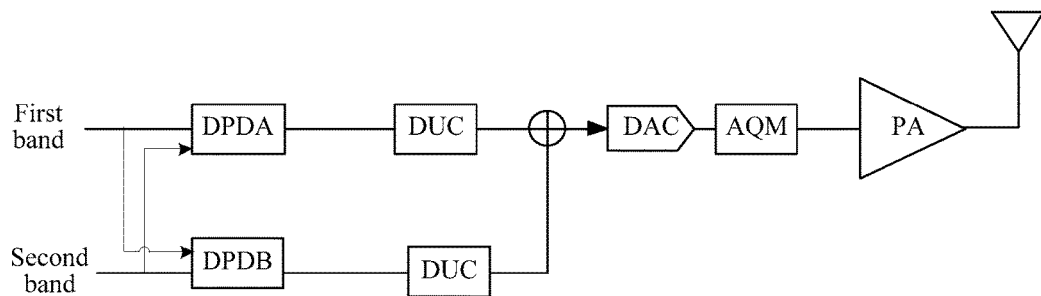
FIG. 1 is a schematic structural diagram of a single-input multi-band transmitter in the prior art.
Figure 2:
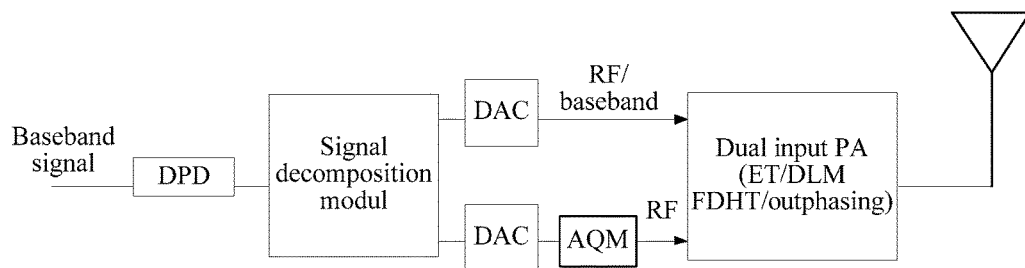
FIG. 2 is a schematic structural diagram of a multi-input single-band transmitter in the prior art.
Figure 3:
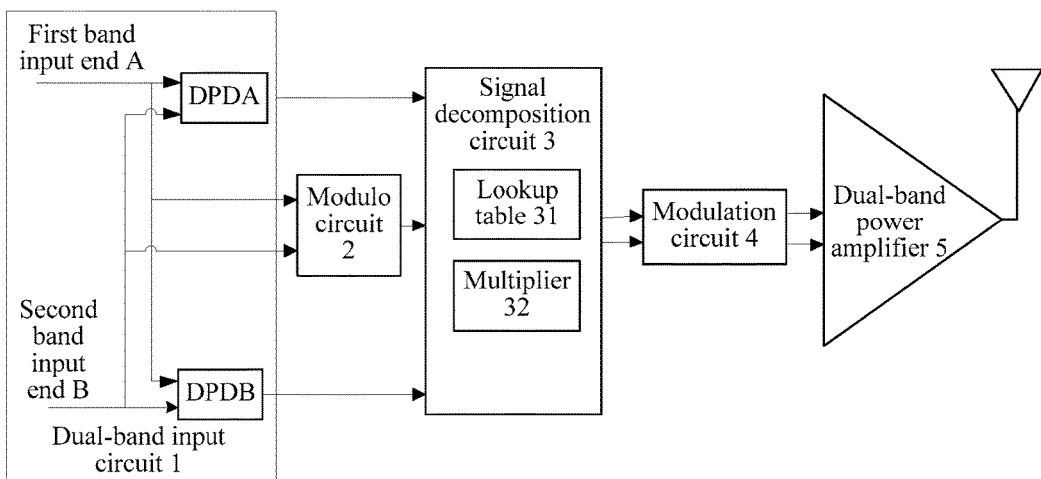
FIG. 3 is a schematic structural diagram of a dual-band dual-input power amplifier transmitter according to Embodiment 1 in accordance with the present disclosure.

As shown in FIG. 3, FIG. 3 is an architectural diagram of a dual-band dual-input power amplifier transmitter according to Embodiment 1 in accordance with the present disclosure. The dual-band dual-input power amplifier transmitter mainly includes: a dual-band input circuit 1, a modulo circuit 2, a signal decomposition circuit 3, a modulation circuit 4, and a dual-band power amplifier 5.

The dual-band input circuit 1 includes: a first band input end A, a second band input end B, and DPD components (marked as DPDA and DPDB in FIG. 3) respectively connected to the first band input end A and the second band input end B.

The dual-band input circuit 1 is configured to output a first baseband signal input by the first band input end A and a second baseband signal input by the second band input end B, where the first baseband signal and the second baseband signal are processed by the DPD components before being output.

It should be noted that an input end of a same DPD component inputs the first baseband signal and the second baseband signal, and the first baseband signal and the second baseband signal that have been processed by the DPD component are separately output at an output end.

The modulo circuit 2 is configured to: perform modulo processing on the first baseband signal and the second baseband signal that are input, and output a corresponding first baseband signal modulus value and a corresponding second baseband signal modulus value.

It should be noted that the modulo circuit 2 may independently exist, or may be disposed in the dual-band input circuit 1, or may be disposed in the signal decomposition circuit 3.

The signal decomposition circuit 3 includes a memory storing a lookup table 31, and a multiplier 32, and is configured to: receive the first baseband signal and the second baseband signal that are input by the DPD components, and the first baseband signal modulus value and the second baseband signal modulus value that are from the modulo circuit 2, and separately perform signal decomposition processing based on the lookup table 31 and the multiplier 32 to obtain multiple decomposed signals after decomposition.

The modulation circuit 4 is connected to the signal decomposition circuit 3, receives the multiple decomposed signals output by the signal decomposition circuit 3, performs combination processing on the multiple decomposed signals to obtain two corresponding processed signals, modulates the two processed signals to corresponding working frequencies, and outputs the two processed signals to the dual-band power amplifier 5.

In this embodiment in accordance with the present disclosure, a multi-input single-band power amplifier is introduced to a dual-band scenario by using the foregoing disclosed circuit architecture. In comparison with a single-input dual-band power amplifier, when a dual-input dual-band power amplifier transmits signals in two bands concurrently, the power amplifier can work normally and maintain relatively high efficiency.

Embodiment 2

Figure 4:
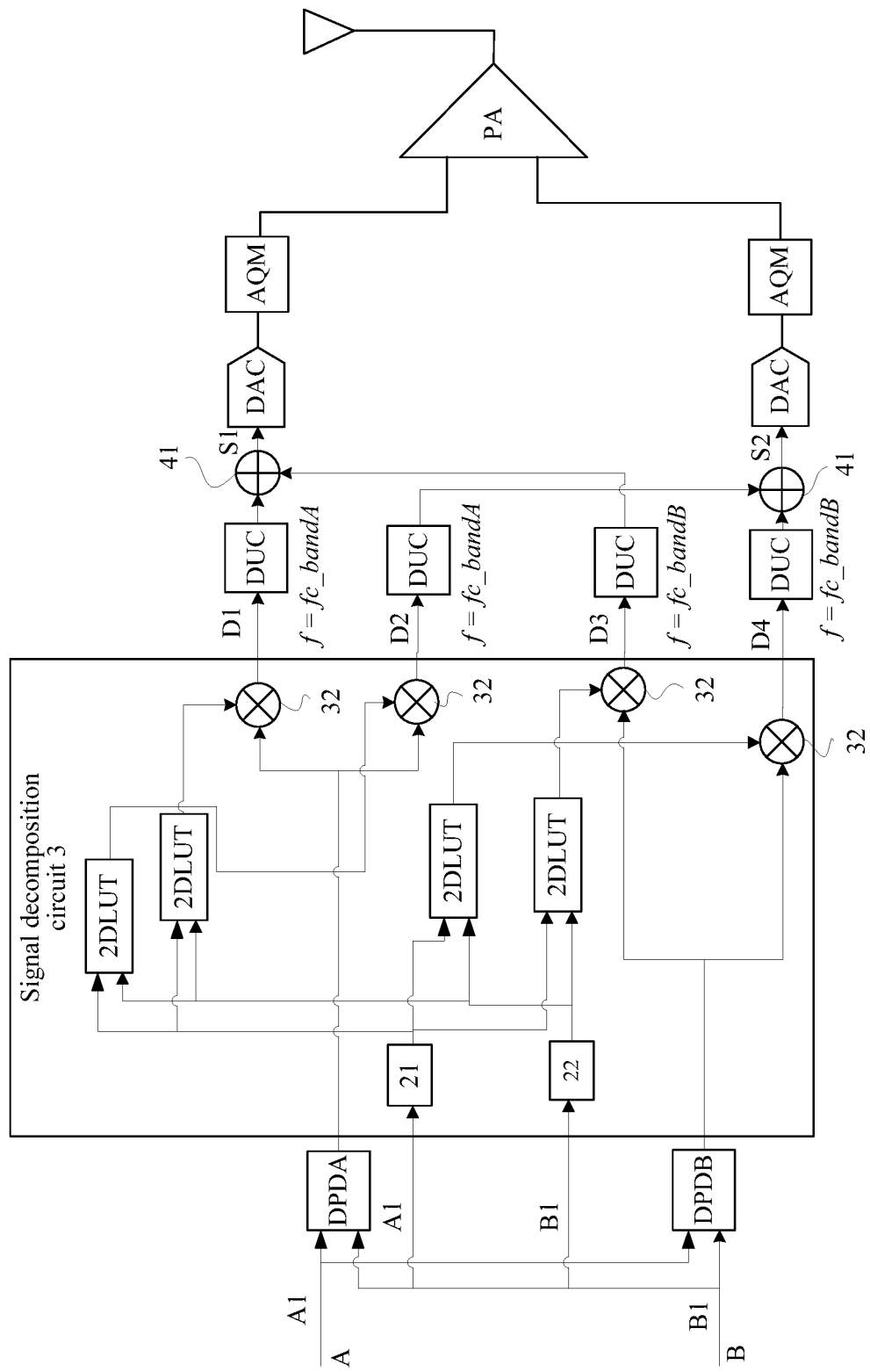
FIG. 4 is a schematic structural diagram of a dual-band dual-input power amplifier transmitter according to Embodiment 2 in accordance with the present disclosure.

Based on the dual-band dual-input power amplifier transmitter disclosed in Embodiment 1 in accordance with the present disclosure, as shown in FIG. 4, FIG. 4 is a schematic structural diagram of a dual-band dual-input power amplifier transmitter according to Embodiment 2 in accordance with the present disclosure. The dual-band dual-input power amplifier transmitter includes: a dual-band input circuit, a modulo circuit, a signal decomposition circuit 3, a modulation circuit, and a dual-band power amplifier 5 (represented by PA in the figure).

The dual-band input circuit includes: a first band input end A, a second band input end B, and a DPDA component and a DPDB component to which a first baseband signal A and a second baseband signal B that are respectively input by the first band input end A and the second band input end B are respectively input. The first baseband signal A1 is input by the first band input end A, and is separately input to the DPDA component and the DPDB component. The second baseband signal B1 is input by the second band input end B, and is separately input to the DPDB component and the DPDA component.

The modulo circuit includes two modulo units (which are indicated by 21 and 22 in FIG. 4).

The modulo unit 21 is connected to the first band input end A, and is configured to perform modulo processing on the first baseband signal A1 input by the first band input end A, to obtain a corresponding first baseband signal modulus value |A1|.

The modulo unit 22 is connected to the second band input end B, and is configured to perform modulo processing on the second baseband signal B1 input by the second band input end B, to obtain a corresponding second baseband signal modulus value |B1|.

It should be noted that in addition to locations, disclosed in FIG. 4, of the modulo unit 21 and the modulo unit 22, the modulo unit 21 and the modulo unit 22 may be respectively connected to output ends of the DPD components, and are configured to perform modulo processing on the first baseband signal and the second baseband signal that are processed by the DPD components, to obtain the corresponding first baseband signal modulus value and the corresponding second baseband signal modulus value that are processed by the DPD components.

In the signal decomposition circuit 3, the lookup table stored in the memory is a two-dimensional lookup table 2DLUT, four such 2DLUTs being stored in the memory. Two input ends of each 2DLUT respectively input the first baseband signal modulus value |A1| and the second baseband signal modulus value |B1|. A quantity of the multipliers 32 is the same as a quantity of the 2DLUTs, and an input of each multiplier 32 is an output of the 2DLUT.

The signal decomposition circuit 3 is configured to: receive the first baseband signal A1 and the second baseband signal B1 that are input by the DPDA and the DPDB, separately multiply, by an output of the 2DLUT by using one multiplier 32, the first baseband signal A1 and the second baseband signal B1 that are input by the DPDA, multiply, by the output of the 2DLUT by using one multiplier 32, the first baseband signal A1 and the second baseband signal B1 that are input by the DPDB, to obtain a first signal D1, a second signal D2, a third signal D3, and a fourth signal D4, and output the first signal D1, the second signal D2, the third signal D3, and the fourth signal D4 to the modulation circuit.

An input end of a same DPD component inputs the first baseband signal A1 and the second baseband signal B1, and the first baseband signal A1 and the second baseband signal B1 that have been processed by the DPD component are separately output at an output end. Usually, values in the four 2DLUTs are different, but the values in the 2DLUTs may be the same in some particular cases.

The foregoing process is described in detail: The first baseband signal A1 is separately input to the DPDA and the DPDB, and is input to the modulo circuit, and the modulo circuit outputs the first baseband signal modulus value |A1|; the second baseband signal B1 is separately input to the DPDA and the DPDB, and is input to the modulo circuit 2, and the modulo circuit outputs the second baseband signal modulus value |B1|.

Digital pre-distortion processing is performed on the first baseband signal A1 and the second baseband signal B1 that are input by the DPDA. The first baseband signal A1 and the second baseband signal B1 that are obtained after digital pre-distortion processing are separately output at the output end. Similar processing is performed for the DPDB.

For the four 2DLUTs, the first baseband signal modulus value |A1| and the second baseband signal modulus value |B1| are input to each 2DLUT, and each 2DLUT processes the two modulus values, and outputs the two modulus values in a form of one signal. Signals output by two 2DLUTs are respectively multiplied, by using one multiplier 32, by the first baseband signal A1 and the second baseband signal B1 that are output by the DPDA, and the first signal D1 and the third signal D3 are output. Signals output by the other two 2DLUTs are respectively multiplied, by using another multiplier 32, the first baseband signal A1 and the second baseband signal B1 that are output by the DPDB, and the second signal D2 and the fourth signal D4 are output. The signal decomposition circuit 3 outputs the first signal D1, the second signal D2, the third signal D3, and the fourth signal D4 to the modulation circuit.

The modulation circuit includes: four DUC components having input ends being separately connected to the signal decomposition circuit 3, two adders 41 cross-connected to the DUCs, DACs connected to the adders 41, and AQM components connected to the DACs.

The modulation circuit is configured to: perform one-to-one up-conversion on the first signal D1 and the second signal D2 by using two of the DUCs to change frequencies of the first signal D1 and the second signal D2 to fc_bandA; perform one-to-one up-conversion on the third signal D3 and the fourth signal D4 by using the other two DUCs to change frequencies of the third signal D3 and the fourth signal D4 to fc_bandB; separately add, by using the adders 41 cross-connected to the DUCs, the first signal D1 on which up-conversion processing has been performed to the third signal D3 on which up-conversion processing has been performed, and the second signal D2 on which up-conversion processing has been performed to the fourth signal D4 on which up-conversion processing has been performed, to obtain a first added signal S1 and a second added signal S2, where digital-to-analog conversion is separately performed on the first added signal S1 and the second added signal S2 by using DACs connected to respective adders 41; and separately modulate, by means of AQM, the first added signal S1 and the second added signal S2 on which digital-to-analog conversion has been performed to corresponding radio frequency working frequencies, and input the first added signal S1 and the second added signal S2 to the dual-input dual-band power amplifier 5 (PA).

Two signals in two bands are processed by a signal decomposition module by using the architecture of the dual-band dual-input power amplifier transmitter disclosed in this embodiment in accordance with the present disclosure, to obtain four signals. Up-conversion is performed on two signals obtained by decomposing a signal in a first band, to change a frequency to fc_bandA. Up-conversion is performed on two signals obtained by decomposing a signal in a second band, to change a frequency to fc_bandB. Then the four signals whose frequencies are changed are cross-added to obtain two signals S1 and S2 that include signals in two bands each. Then, digital-to-analog conversion is separately performed on the signals S1 and S2 by using DACs, and the signals S1 and S2 are modulated to radio frequency working frequencies by means of AQM, and then are input to the dual-input dual-band power amplifier.

In this embodiment in accordance with the present disclosure, a multi-input single-band power amplifier is introduced to a dual-band scenario by using the foregoing disclosed circuit architecture. When a dual-input dual-band power amplifier transmits signals in two bands concurrently, the power amplifier can work normally and maintain relatively high efficiency.

Embodiment 3

Figure 5:
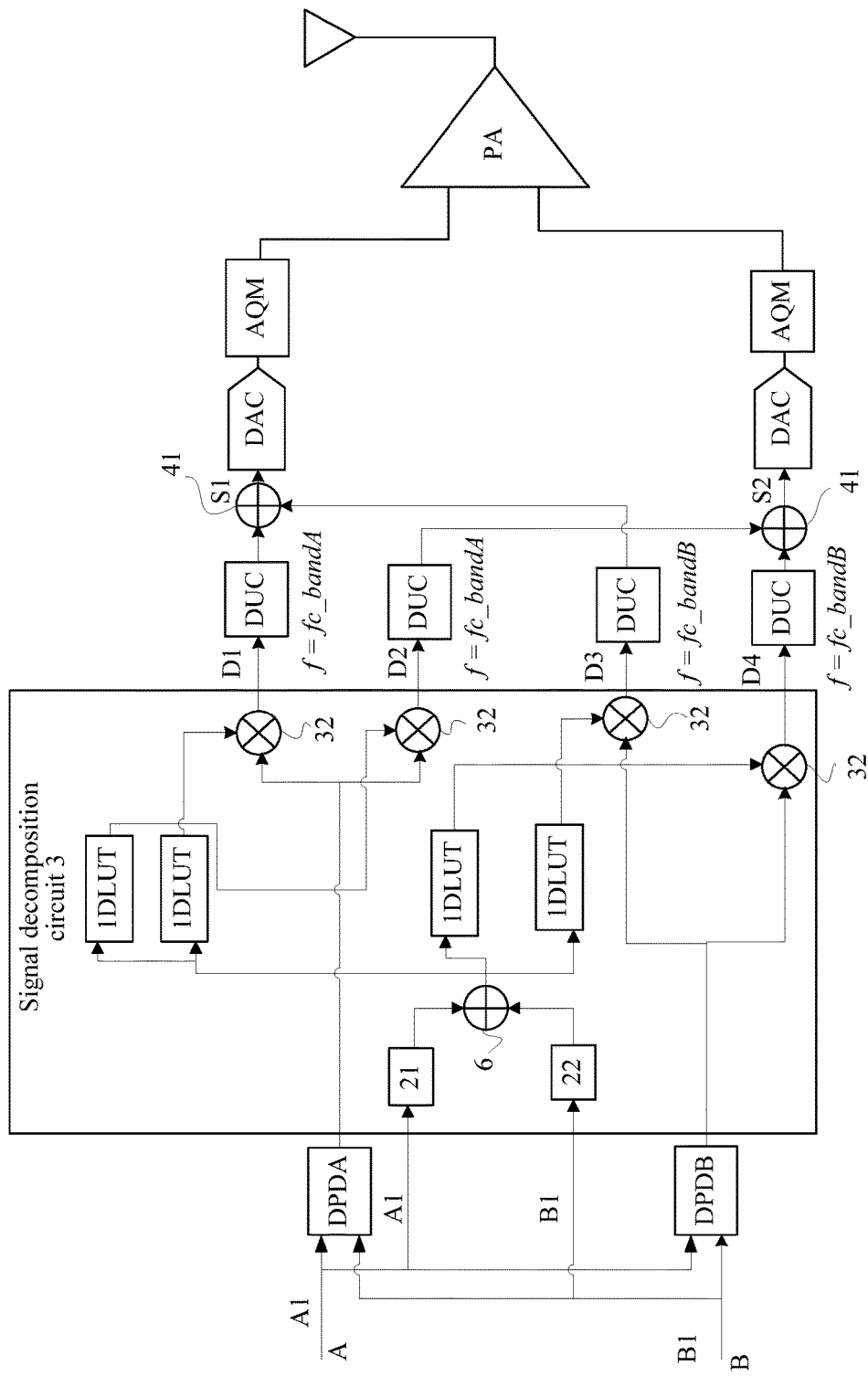
FIG. 5 is a schematic structural diagram of a dual-band dual-input power amplifier transmitter according to Embodiment 3 in accordance with the present disclosure.

Based on the dual-band dual-input power amplifier transmitter disclosed in Embodiment 1 and Embodiment 2 in accordance with the present disclosure, as shown in FIG. 5, FIG. 5 is a schematic structural diagram of a dual-band dual-input power amplifier transmitter according to Embodiment 3 in accordance with the present disclosure. The dual-band dual-input power amplifier transmitter includes: a dual-band input circuit, a modulo circuit, an adder 6, a signal decomposition circuit 3, a modulation circuit, and a dual-band power amplifier 5 (PA).

A difference from the dual-band dual-input power amplifier transmitter disclosed in Embodiment 2 in accordance with the present disclosure is the adder 6 connected to the modulo circuit. The adder 6 is configured to use outputs of two modulo units 21 and 22 in the modulo circuit as inputs, to obtain a sum of the first baseband signal modulus value |A1| and the second baseband signal modulus value |B1| that are obtained after modulo processing performed by the modulo circuit.

In the signal decomposition circuit 3, a lookup table stored in the memory is a one-dimensional lookup table 1DLUT, and there are four such 1DLUTs in the memory. A quantity of the multipliers 32 is the same as a quantity of the 1DLUTs. When an input of each multiplier 32 is an output of the 1DLUT, an input of each 1DLUT is the sum of the first baseband signal modulus value |A1| and the second baseband signal modulus value |B1| that is output by the adder.

In Embodiment 3 in accordance with the present disclosure, a 2DLUT is replaced by |A1|+|B1| and the 1DLUT. A theoretical basis is that performance of a dual-band power amplifier is always limited by a maximum voltage swing, and a value of |A1|+|B1| corresponds to a maximum swing of a transient signal of the power amplifier. Optimal performance can be approximately obtained when a same out-phasing phase angle (an output value of an LUT) is applied to the power amplifier for same maximum swings.

In the dual-band dual-input power amplifier transmitter disclosed in Embodiment 3 in accordance with the present disclosure, execution processes of the dual-band input circuit 1, the modulo circuit 2, the modulation circuit 4, and the dual-band power amplifier 5 are the same as those in Embodiment 1 and Embodiment 2 in accordance with the present disclosure, and details are not described herein again. Signal processing in the signal decomposition circuit 3 is mainly described in detail.

The signal decomposition circuit is configured to: receive a first baseband signal and a second baseband signal that are input by the two DPD components, separately multiply, by an output of one of the 1DLUTs by using one multiplier, the first baseband signal and the second baseband signal that are input by a same DPD component, to obtain a first signal D1, a second signal D2, a third signal D3, and a fourth signal D4, and output the first signal D1, the second signal D2, the third signal D3, and the fourth signal D4 to the modulation circuit.

An input end of the same DPD component inputs the first baseband signal A1 and the second baseband signal B1, and the first baseband signal A1 and the second baseband signal B1 that have been processed by the DPD component are separately output at an output end. Usually, values in the four 1DLUTs are different, but the values in the 1DLUTs may be the same in some particular cases.

In comparison with the values in Embodiment 2 in accordance with the present disclosure, an advantage of the values in the four 1DLUTs used in the architecture is that the values in the 1DLUTs of this embodiment do not need to be obtained by means of multi-dimensional dual-tone traversal scan, and single-tone scan needs to be performed only on an optimal path in each band. In comparison with Embodiment 2 in accordance with the present disclosure, there are obvious improvements on resources and complexity. However, the present invention is not limited thereto. The values may be obtained in another manner.

The foregoing process is described in detail: The sum of the first baseband signal modulus value |A1| and the second baseband signal modulus value |B1| are input to each 1DLUT. A signal is output after being processed by the 1DLUT to serve as an input of a multiplier 32. Each 1DLUT correspondingly serves as an input of a multiplier 32. Another input of two multipliers 32 is the first baseband signal A1 that is separately input by the DPDA and the DPDB and that is obtained after digital pre-distortion processing. Another input of the remaining two multipliers 32 is the second baseband signal that is separately input by the DPDA and the DPDB and that is obtained after digital pre-distortion processing.

A first signal D5, a second signal D6, a third signal D7, and a fourth signal D8 on which multiplying processing is performed by the four multipliers 32 are output to the modulation circuit. The modulation circuit is consistent with the modulation circuit shown in FIG. 4, and details are not described herein again.

It should be noted that "first", "second", "third", and "fourth" in the first signal, the second signal, the third signal, the first added signal, and the second added signal in Embodiment 2 in accordance with the present disclosure and Embodiment 3 in accordance with the present disclosure are merely used to identify several signals obtained in the processing process, and do not indicate that content included in signals of same identifiers in Embodiment 2 and Embodiment 3 is the same.

Two signals in two bands are processed by a signal decomposition module by using the architecture of the dual-band dual-input power amplifier transmitter disclosed in this embodiment in accordance with the present disclosure, to obtain four signals. Up-conversion is performed on two signals obtained by decomposing a signal in a first band, to change a frequency to fc_bandA. Up-conversion is performed on two signals obtained by decomposing a signal in a second band, to change a frequency to fc_bandB. Then the four signals whose frequencies are changed are cross-added to obtain two signals S1 and S2 that include signals in two bands each. Then, digital-to-analog conversion is separately performed on the signals S1 and S2 by using DACs, and the signals S1 and S2 are modulated to radio frequency working frequencies by means of AQM, and then are input to the dual-input dual-band power amplifier.

In this embodiment in accordance with the present disclosure, a multi-input single-band power amplifier is introduced to a dual-band scenario by using the foregoing disclosed circuit architecture. In comparison with a single-input dual-band power amplifier, when a dual-input dual-band power amplifier transmits signals in two bands concurrently, the power amplifier can work normally and maintain relatively high efficiency.

Embodiment 4

Figure 6:
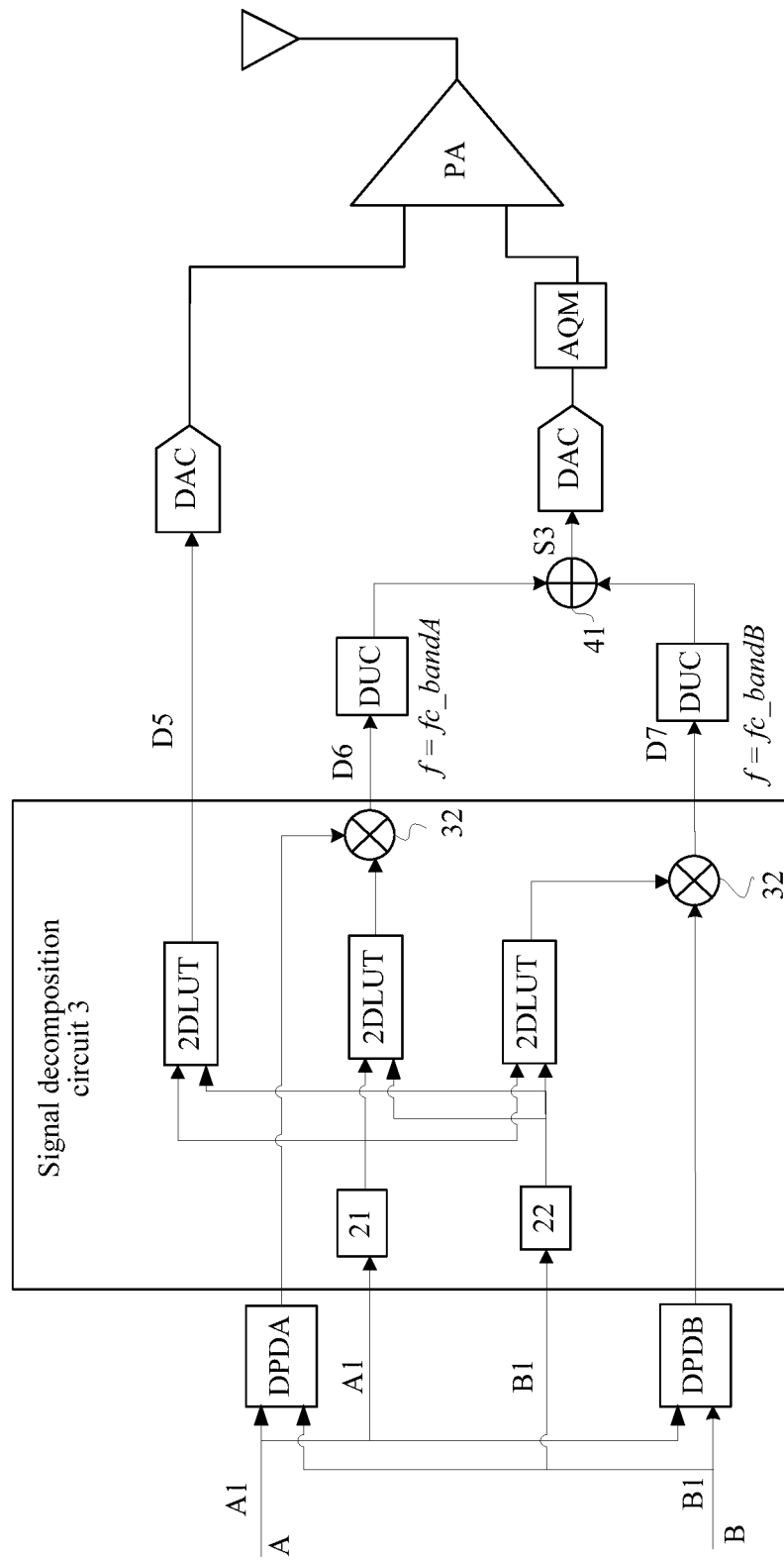
FIG. 6 is a schematic structural diagram of a dual-band dual-input power amplifier transmitter according to Embodiment 4 in accordance with the present disclosure.

Based on the dual-band dual-input power amplifier transmitter disclosed in Embodiment 1 and Embodiment 2 in accordance with the present disclosure, as shown in FIG. 6, FIG. 6 is a schematic structural diagram of a dual-band dual-input power amplifier transmitter according to Embodiment 4 in accordance with the present disclosure. The dual-band dual-input power amplifier transmitter includes: a dual-band input circuit, a modulo circuit, a signal decomposition circuit 3, a modulation circuit, and a dual-band power amplifier 5 (which is PA in the figure).

The dual-band input circuit includes: a first band input end A, a second band input end B, and a DPDA component and a DPDB component to which a first baseband signal A and a second baseband signal B that are respectively input by the first band input end A and the second band input end B are respectively input. The first baseband signal A1 is input by the first band input end A, and is separately input to the DPDA component and the DPDB component. The second baseband signal B1 is input by the second band input end B, and is separately input to the DPDB component and the DPDA component.

The modulo circuit includes two modulo units (which are indicated by 21 and 22 in FIG. 6).

The modulo unit 21 is connected to the first band input end A, and is configured to perform modulo processing on the first baseband signal A1 input by the first band input end A, to obtain a corresponding first baseband signal modulus value |A1|.

The modulo unit 22 is connected to the second band input end B, and is configured to perform modulo processing on the second baseband signal B11 input by the second band input end B, to obtain a corresponding second baseband signal modulus value |B1|.

It should be noted that in addition to locations, disclosed in FIG. 6, of the modulo unit 21 and the modulo unit 22, the modulo unit 21 and the modulo unit 22 may be respectively connected to output ends of the DPD components, and are configured to perform modulo processing on the first baseband signal and the second baseband signal that are processed by the DPD components, to obtain the corresponding first baseband signal modulus value and the corresponding second baseband signal modulus value that are processed by the DPD components.

A difference from the signal decomposition circuit disclosed in Embodiment 2 and Embodiment 3 in accordance with the present disclosure is that in the signal decomposition circuit 3 disclosed in Embodiment 4 in accordance with the present disclosure, there are at least three lookup tables in the memory. The lookup tables are 2DLUTs. The first baseband signal modulus value |A1| and the second baseband signal modulus value |B1| are input to each 2DLUT. Two of the 2DLUTs are connected to one multiplier 32 each. An input of each multiplier 32 is an output of the 2DLUT. In the signal decomposition circuit 3, there are only two multipliers 32.

Based on the structure disclosed above, the signal decomposition circuit 3 is configured to: use an output of the 2DLUT not connected to a multiplier 32 as a fifth signal D5, directly output the fifth signal D5 to the modulation circuit 4, receive the first baseband signal A1 and the second baseband signal B1 that are input by the DPD components and that are combined into one signal, separately multiply, by the outputs of the 2DLUTs connected to the multiplier 32, the signal into which the first baseband signal A1 and the second baseband signal B1 are combined, to obtain a sixth signal D6 and a seventh signal D7, and output the sixth signal D6 and the seventh signal D7 to the modulation circuit.

Usually, values in the three 2DLUTs are different, but the values in the 2DLUTs may be the same in some particular cases.

The foregoing process is described in detail: The DPDA receives the first baseband signal A1 and the second baseband signal B1, performs digital pre-distortion processing on the signals in two bands, outputs a signal into which the two signals are combined after processing, and uses the signal as an input of a multiplier 32 connected to a 2DLUT. The DPDB performs the same processing. The first baseband signal modulus value |A1| and the second baseband signal modulus value |B1| are input to each 2DLUT, and are output in a form of one signal after processing. Signals output by two 2DLUTs are respectively input to respectively connected multipliers 32, and are multiplied by one signal obtained by performing digital pre-distortion processing on the first baseband signal A1 and the second baseband signal B1 to obtain a sixth signal D6 and a seventh signal D7. The sixth signal D6 and the seventh signal D7 are output to the modulation circuit 4. Another 2DLUT not connected to a multiplier processes the first baseband signal modulus value |A1| and the second baseband signal modulus value |B1| that are input, to obtain one signal, and directly outputs the signal to the modulation circuit 4.

The modulation circuit includes: a DAC directly connected to an end of the memory storing the lookup table not connected to the multiplier 32 in the signal decomposition circuit 3, where the lookup table includes a 2DLUT, two DUC components respectively connected to output ends of two multipliers 32 in the signal decomposition circuit 3, an adder 41 connected to the two DUCs, the other DAC connected to the adder 41, and an AQM component connected to the other DAC.

The modulation circuit is configured to: directly input, to the dual-band power amplifier 5, an envelope signal S4 output by the DAC directly connected to the signal decomposition circuit 3, perform up-conversion on the sixth signal D6 by using the DUC component to change a frequency of the sixth signal D6 to fc_bandA, perform up-conversion on the seventh signal D7 by using the other DUC component to change a frequency of the seventh signal D7 to fc_bandB, add, by using the adder, the seventh signal D7 on which up-conversion processing has been performed to the sixth signal D6 on which up-conversion processing has been performed to obtain a third added signal S3, perform digital-to-analog conversion on the third added signal S3 by using the DAC connected to the adder 6, modulate the third added signal S3 obtained after conversion to a corresponding radio frequency working frequency by using the AQM component, and input the third added signal S3 obtained after conversion to the dual-band power amplifier 5.

It should be noted that the envelope signal S4 in the architecture disclosed in Embodiment 4 in accordance with the present disclosure is output by a 2DLUT whose input is modulus values of signals in two bands. A drain voltage or a load modulation voltage of the power amplifier is adjusted in real time according to an envelope of the envelope signal.

Two signals in two bands are processed by a signal decomposition module by using the architecture of the dual-band dual-input power amplifier transmitter disclosed in this embodiment in accordance with the present disclosure, to obtain four signals. Up-conversion is performed on two signals obtained by decomposing a signal in a first band, to change a frequency to fc_bandA. Up-conversion is performed on two signals obtained by decomposing a signal in a second band, to change a frequency to fc_bandB. Then the four signals whose frequencies are changed are cross-added to obtain two signals S1 and S2 that include signals in two bands each. Then, digital-to-analog conversion is separately performed on the signals S1 and S2 by using DACs, and the signals S1 and S2 are modulated to radio frequency working frequencies by means of AQM, and then are input to the dual-input dual-band power amplifier.

In this embodiment in accordance with the present disclosure, a multi-input single-band power amplifier is introduced to a dual-band scenario by using the foregoing disclosed circuit architecture. In comparison with a single-input dual-band power amplifier, when a dual-input dual-band power amplifier transmits signals in two bands concurrently, the power amplifier can work normally and maintain relatively high efficiency.

It should be noted that based on the dual-band dual-input power amplifier transmitter disclosed in Embodiment 4 in accordance with the present disclosure, in the signal decomposition circuit 3 shown in FIG. 6, outputs of 2DLUTs that are connected to two multipliers 32 and whose inputs are the first baseband signal modulus value and the second baseband signal modulus value may be identically equal to 1, that is, the two 2DLUTs connected to the multipliers 32 may not exist.

That is, the signal decomposition circuit 3 is configured to: use an output of the 2DLUT as a fifth signal D5, directly output the fifth signal D5 to the modulation circuit, receive the first baseband signal A1 and the second baseband signal B1 that are input by the DPD components and that are combined into one signal, separately multiply, directly by using the multiplier 32, the received first baseband signal modulus value |A1| and second baseband signal modulus value |B1| by the signal into which the first baseband signal A1 and the second baseband signal B1 are combined, to obtain a sixth signal D6 and a seventh signal D7, and output the sixth signal D6 and the seventh signal D7 to the modulation circuit.

Similarly, a multi-input single-band power amplifier can still be introduced to a dual-band scenario by using the architecture. In comparison with a single-input dual-band power amplifier, when a dual-input dual-band power amplifier transmits signals in two bands concurrently, the power amplifier can work normally and maintain relatively high efficiency.

Embodiment 5

Figure 7:
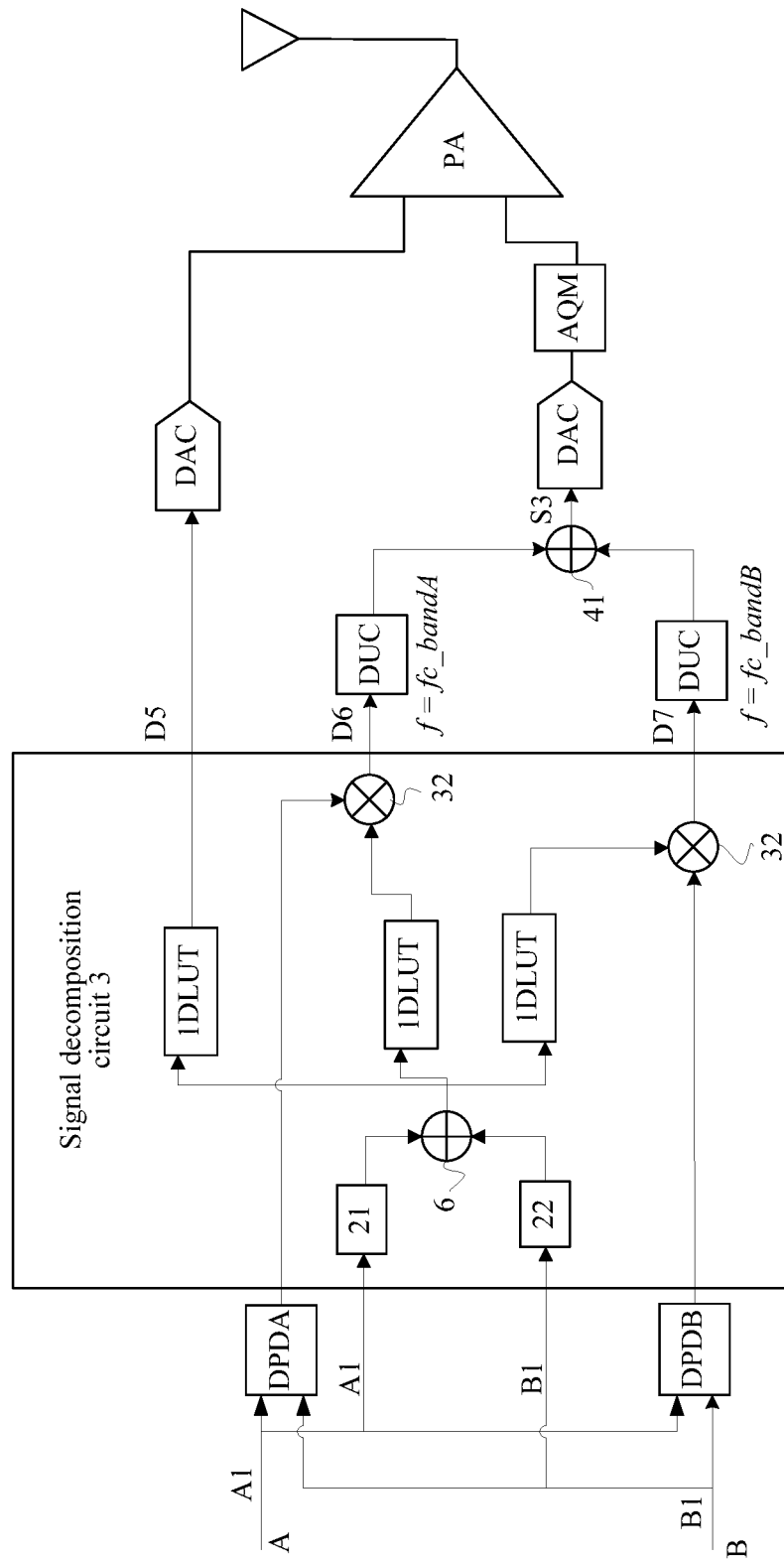
FIG. 7 is a schematic structural diagram of a dual-band dual-input power amplifier transmitter according to Embodiment 5 in accordance with the present disclosure.

Based on the dual-band dual-input power amplifier transmitter disclosed in Embodiment 1 and Embodiment 4 in accordance with the present disclosure, as shown in FIG. 7, FIG. 7 is a schematic structural diagram of a dual-band dual-input power amplifier transmitter according to Embodiment 5 in accordance with the present disclosure. The dual-band dual-input power amplifier transmitter includes: a dual-band input circuit, a modulo circuit, an adder 6, a signal decomposition circuit 3, a modulation circuit, and a dual-band power amplifier 5 (which is PA in the figure).

A difference from the dual-band dual-input power amplifier transmitter disclosed in Embodiment 4 in accordance with the present disclosure is the adder 6 connected to the modulo circuit. The adder 6 is configured to use outputs of two modulo units 21 and 22 in the modulo circuit as inputs, to obtain a sum of the first baseband signal modulus value |A1| and the second baseband signal modulus value |B1| that are obtained after modulo processing performed by the modulo circuit.

In the signal decomposition circuit, a lookup table stored in the memory is a one-dimensional lookup table 1DLUT. There are three such 1DLUTs in the memory. A sum of the first baseband signal modulus value |A1| and the second baseband signal modulus value |B1| that is output by the adder 6 is input to each 1DLUT. Two of the 1DLUTs are connected to one multiplier 32 each, and an input of each multiplier 32 is an output of the 1DLUT.

In Embodiment 5 in accordance with the present disclosure, a 2DLUT is replaced by |A1|+|B1| and the 1DLUT. A theoretical basis is that performance of a dual-band power amplifier is always limited by a maximum voltage swing, and a value of |A1|+|B1| corresponds to a maximum swing of a transient signal of a power amplifier. Optimal performance can be approximately obtained when a same outphasing phase angle (an output value of an LUT) should be applied to the power amplifier for same maximum swings.

The signal decomposition circuit 3 is configured to: use an output of the 1DLUT not connected to a multiplier as a fifth signal D5, directly output the fifth signal D5 to the modulation circuit, receive the first baseband signal A1 and the second baseband signal B1 that are input by the DPD components and that are combined into one signal, separately multiply, by the outputs of the 1DLUTs connected to the multipliers 32, the signal into which the first baseband signal A1 and the second baseband signal B1 are combined, to obtain a sixth signal D6 and a seventh signal D7, and output the sixth signal D6 and the seventh signal D7 to the modulation circuit.

Usually, values in the three 1DLUTs are different, but the values in the 1DLUTs may be the same in some particular cases.

It should be noted that "fifth", "sixth", "seventh", and "third" in the fifth signal D5, the sixth signal, the seventh signal, and the third added signal in Embodiment 4 in accordance with the present disclosure and Embodiment 5 in accordance with the present disclosure are merely used to identify several signals obtained in the processing process, and do not indicate that content included in signals of same identifiers in Embodiment 4 and Embodiment 5 is the same.

It should be noted that based on the dual-band dual-input power amplifier transmitter disclosed in Embodiment 5 in accordance with the present disclosure, in the signal decomposition circuit 3 shown in FIG. 7, outputs of 1DLUTs that are connected to two multipliers 32 and whose inputs are the sum of the first baseband signal modulus value |A1| and the second baseband signal modulus value |B1| may be identically equal to 1, that is, the 1DLUTs connected to the two multipliers 32 may not exist (broken line boxes in the figure show that the 1DLUTs may exist or may not exist).

That is, in the signal decomposition circuit 3, there are at least one such 1DLUT in the memory, and the sum of the first baseband signal modulus value |A1| and the second baseband signal modulus value |B1| that is output by the adder 6 is input to the 1DLUT. An output of the 1DLUT is directly connected to a DAC in the modulation circuit.

The signal decomposition circuit 3 is configured to: use an output of the 1DLUT as a fifth signal D5, directly output the fifth signal D5 to the modulation circuit, receive the first baseband signal A1 and the second baseband signal B1 that are input by the DPD components and that are combined into one signal, separately multiply, by using the multiplier 32, the received first baseband signal modulus value |A1| and second baseband signal modulus value |B1| by the signal into which the first baseband signal A1 and the second baseband signal B1 are combined, to obtain a sixth signal D6 and a seventh signal D7, and output the sixth signal D6 and the seventh signal D7 to the modulation circuit.

In conclusion, according to the architecture of the dual-band dual-input power amplifier transmitter disclosed in Embodiment 1 to Embodiment 5 in accordance with the present disclosure, a multi-input single-band power amplifier can still be introduced to a dual-band scenario by using the architecture. In comparison with a single-input dual-band power amplifier, when a dual-input dual-band power amplifier transmits signals in two bands concurrently, the power amplifier can work normally and maintain relatively high efficiency.

Based on the foregoing descriptions of the embodiments, a person skilled in the art may clearly understand that this application may be implemented by software in addition to a necessary hardware platform or by hardware only. In most circumstances, the former is a preferred implementation manner. Based on such an understanding, all or the part of the technical solutions in accordance with the present disclosure contributing to the technology in the background part may be implemented in the form of a software product. The computer software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments in accordance with the present disclosure.

The embodiments in this specification are all described in a progressive manner, for same or similar parts in the embodiments, refer to these embodiments, and each embodiment focuses on a difference from other embodiments. The system disclosed in the embodiments is described relatively simply because it corresponds to the method disclosed in the embodiments, and for portions related to those of the method, refer to the description of the method.

Specific examples are used in this specification to describe the principle and implementation manners in accordance with the present disclosure. The foregoing embodiments are merely intended to help understand the method and idea in accordance with the present disclosure. In addition, with respect to the implementation manners and the application scope, modifications may be made by a person of ordinary skill in the art according to the idea in accordance with the present disclosure. Therefore, the content of this specification shall not be construed as a limitation to this application.

The embodiments disclosed above are described to enable a person skilled in the art to implement or use the present invention. Various modifications to the embodiments are obvious to the person skilled in the art, and general principles defined in this specification may be implemented in other embodiments without departing from the spirit or scope of the present invention. Therefore, the present invention will not be limited to the embodiments described in this specification but extends to the widest scope that complies with the principles and novelty disclosed in this specification.

What is claimed is:

1. A transmitter, comprising: a dual-band input circuit, a modulo circuit, a signal decomposition circuit, a modulation circuit, and a dual-band power amplifier, wherein
the dual-band input circuit comprises a first band input end, a second band input end, and two digital predistortion (DPD) components connected to the first band input end and the second band input end, and is configured to output a first baseband signal input by the first band input end and a second baseband signal input by the second band input end, wherein the first baseband signal and the second baseband signal are processed by the DPD components before being output;
the modulo circuit is configured to: perform modulo processing on the first baseband signal and the second baseband signal that are input, and output a corresponding first baseband signal modulus value and a corresponding second baseband signal modulus value;
the signal decomposition circuit comprises a memory storing a lookup table, and a multiplier, and is configured to: receive the first baseband signal and the second baseband signal that are input by the DPD components, and the first baseband signal modulus value and the second baseband signal modulus value that are from the modulo circuit, and separately perform signal decomposition processing based on the lookup table and the multiplier to obtain multiple decomposed signals; and
the modulation circuit is connected to the signal decomposition circuit, and is configured to receive the multiple decomposed signals output by the signal decomposition circuit, to perform combination processing on the multiple decomposed signals to obtain two corresponding processed signals, to modulate the two processed signals to corresponding working frequencies, and to output the two processed signals to the dual-band power amplifier.

2. The transmitter according to claim 1, wherein the modulo circuit comprises two modulo units, respectively connected to the first band input end and the second band input end, and configured to respectively perform modulo processing on the first baseband signal input by the first band input end and the second baseband signal input by the second band input end, to obtain the corresponding first baseband signal modulus value and the corresponding second baseband signal modulus value; or
respectively connected to output ends of the DPD components, and configured to perform modulo processing on the first baseband signal and the second baseband signal that are processed by the DPD components, to obtain the corresponding first baseband signal modulus value and the corresponding second baseband signal modulus value that are processed by the DPD components.

3. The transmitter according to claim 1, wherein in the signal decomposition circuit, the lookup table stored in the memory is a two-dimensional lookup table (2DLUT), four such 2DLUTs being stored in the memory, and wherein the first baseband signal modulus value and the second baseband signal modulus value are input to each 2DLUT, a quantity of the multipliers is the same as a quantity of the 2DLUTs, and an input of each multiplier is an output of each 2DLUT; and, wherein
the signal decomposition circuit is configured to:
receive the first baseband signal and the second baseband signal that are input by the two DPD components,
for the first baseband signal and the second baseband are input by each of the two DPD components, multiply, the first baseband signal by an output of one of the 2DLUTs by using one of the multipliers and multiply the second baseband signal by an output of another one of the 2DLUTs by using another one of the multipliers, to obtain a first signal, a second signal, a third signal, and a fourth signal, and
output the first signal, the second signal, the third signal, and the fourth signal to the modulation circuit, wherein
the first baseband signal and the second baseband signal are input into an input end of the same DPD component, and the first baseband signal and the second baseband signal that have been processed by the DPD component are separately output at an output end.

4. The transmitter according to claim 1, further comprising: an adder connected to the modulo circuit, wherein the adder is configured to use outputs of two modulo units in the modulo circuit as inputs, and to obtain a sum of the first baseband signal modulus value and the second baseband signal modulus value that are obtained after modulo processing performed by the modulo circuit; and, wherein in the signal decomposition circuit, the lookup table stored in the memory is a one-dimensional lookup table 1DLUT, four such 1DLUTs being stored in the memory, and wherein a quantity of the multipliers is the same as a quantity of the 1DLUTs, and when an input of each multiplier is an output of the 1DLUT, an input of each 1DLUT is the sum of the first baseband signal modulus value and the second baseband signal modulus value that is output by the adder; and the signal decomposition circuit is configured to:
  receive the first baseband signal and the second baseband signal that are input by the two DPD components,
  for the first baseband signal and the second baseband are from each of the two DPD components, multiply, the first baseband signal by an output of one of the 2DLUTs by using one of the multipliers and multiply the second baseband signal by an output of another one of the 2DLUTs by using another one of the multipliers, to obtain a first signal, a second signal, a third signal, and
  a fourth signal, and output the first signal, the second signal, a third signal, and a fourth signal to the modulation circuit, wherein
  the first baseband signal and the second baseband signal are input into an input end of the same DPD component, and the first baseband signal and the second baseband signal that have been processed by the DPD component are separately output at an output end.

5. The transmitter according to claim 1, wherein the modulation circuit comprises: four digital up-conversion (DUC) components having input ends being separately connected to the signal decomposition circuit, two adders cross-connected to the DUCs, digital-to-analog converters (DACs) connected to the adders, and analog quadrate modulation (AQM) components connected to the DACs; and, wherein the modulation circuit is configured to:
  perform one-to-one up-conversion on the first signal and the second signal by using two of the DUCs to change frequencies of the first signal and the second signal to fc_bandA;
  perform one-to-one up-conversion on the third signal and the fourth signal by using the other two DUCs to change frequencies of the third signal and the fourth signal to fc_bandB;
  separately add, by using the adders cross-connected to the DUCs, the up-conversion processed first signal to the up-conversion processed third signal, and the up-conversion processed second signal to the up-conversion processed fourth signal, to obtain a first added signal and a second added signal, wherein digital-to-analog conversion is separately performed on the first added signal and the second added signal by using DACs connected to respective adders; and
  separately modulate, by using the AQM components, the first added and digital-to-analog converted signal and the second added and digital-to-analog converted signal to corresponding radio frequency working frequencies, and input the first added signal and the second added signal to the dual-band power amplifier.

6. The transmitter according to claim 2, wherein the modulation circuit comprises: four digital up-conversion (DUC) components having input ends being separately connected to the signal decomposition circuit, two adders cross-connected to the DUCs, digital-to-analog converters (DACs) connected to the adders, and analog quadrate modulation (AQM) components connected to the DACs; and, wherein the modulation circuit is configured to:
  perform one-to-one up-conversion on the first signal and the second signal by using two of the DUCs to change frequencies of the first signal and the second signal to fc_bandA;
  perform one-to-one up-conversion on a third signal and a fourth signal by using the other two DUCs to change frequencies of the third signal and the fourth signal to fc_bandB; separately add, by using the adders cross-connected to the DUCs, the up-conversion processed first signal to the up-conversion processed third signal, and the up-conversion processed second signal to the up-conversion processed fourth signal, to obtain a first added signal and a second added signal, wherein digital-to-analog conversion is separately performed on the first added signal and the second added signal by using DACs connected to respective adders; and
  separately modulate, by using the AQM components, the first added and digital-to-analog converted signal and the second added and digital-to-analog converted signal to corresponding radio frequency working frequencies, and input the first added signal and the second added signal to the dual-band power amplifier.

7. The transmitter according to claim 3, wherein the modulation circuit comprises: four digital up-conversion (DUC) components having input ends being separately connected to the signal decomposition circuit, two adders cross-connected to the DUCs, digital-to-analog converters (DACs) connected to the adders, and analog quadrate modulation (AQM) components connected to the DACs; and the modulation circuit is configured to:
  perform one-to-one up-conversion on the first signal and the second signal by using two of the DUCs to change frequencies of the first signal and the second signal to fc_bandA;
  perform one-to-one up-conversion on the third signal and the fourth signal by using the other two DUCs to change frequencies of the third signal and the fourth signal to fc_bandB;
  separately add, by using the adders cross-connected to the DUCs, the up-conversion processed first signal to the up-conversion processed third signal, and the up-conversion processed second signal to the up-conversion processed fourth signal, to obtain a first added signal and a second added signal, wherein digital-to-analog conversion is separately performed on the first added signal and the second added signal by using DACs connected to respective adders; and
  separately modulate, by using the AQM components, the first added and digital-to-analog converted signal and the second added and digital-to-analog converted signal to corresponding radio frequency working frequencies, and input the first added signal and the second added signal to the dual-band power amplifier.

8. The transmitter according to claim 4, wherein the modulation circuit comprises: four digital up-conversion (DUC) components having input ends being separately connected to the signal decomposition circuit, two adders cross-connected to the DUCs, digital-to-analog converters (DACs) connected to the adders, and analog quadrate modulation (AQM) components connected to the DACs; and, wherein
the modulation circuit is configured to:
perform one-to-one up-conversion on the first signal and the second signal by using two of the DUCs to change frequencies of the first signal and the second signal to fc_bandA;
perform one-to-one up-conversion on the third signal and the fourth signal by using the other two DUCs to change frequencies of the third signal and the fourth signal to fc_bandB;
separately add, by using the adders cross-connected to the DUCs, the up-conversion processed first signal to the up-conversion processed third signal, and the up-conversion processed second signal to the up-conversion processed fourth signal, to obtain a first added signal and a second added signal, wherein digital-to-analog conversion is separately performed on the first added signal and the second added signal by using DACs connected to respective adders; and
separately modulate, by using the AQM components, the first added and digital-to-analog converted signal and the second added and digital-to-analog converted signal to corresponding radio frequency working frequencies, and input the first added signal and the second added signal to the dual-band power amplifier.

9. The transmitter according to claim 1, wherein in the signal decomposition circuit, the lookup table stored in the memory is a two-dimensional lookup table 2DLUT, three such 2DLUTs being stored in the memory, and wherein the first baseband signal modulus value and the second baseband signal modulus value are input to each 2DLUT, two of the 2DLUTs are connected to one multiplier each, and an input of each multiplier is an output of each 2DLUT; and
the signal decomposition circuit is configured to:
use an output of the 2DLUT not connected to a multiplier as a fifth signal,
directly output the fifth signal to the modulation circuit,
receive the first baseband signal and the second baseband signal that are input by the DPD components and that are combined into one signal,
for each signal combined and from each of the DPD components, multiply, by the output of one of the 2DLUTs connected to one of the multipliers, the signal into which the first baseband signal and the second baseband signal are combined, to obtain a sixth signal and a seventh signal, and
output the sixth signal and the seventh signal to the modulation circuit.

10. The transmitter according to claim 1, wherein in the signal decomposition circuit, the lookup table stored in the memory is a two-dimensional lookup table 2DLUT, one such 2DLUT being stored in the memory, and wherein the first baseband signal modulus value and the second baseband signal modulus value are input to the 2DLUT; and
the signal decomposition circuit is configured to:
use an output of the 2DLUT as a fifth signal,
directly output the fifth signal to the modulation circuit,
receive the first baseband signal and the second baseband signal that are input by the DPD components and that are combined into one signal,
for each signal combined and from each of the DPD components, multiply, by using the multiplier, the received first baseband signal modulus value and second baseband signal modulus value by the signal into which the first baseband signal and the second baseband signal are combined, to obtain a sixth signal and a seventh signal, and
output the sixth signal and the seventh signal to the modulation circuit.

11. The transmitter according to claim 1, further comprising: an adder connected to the modulo circuit, wherein the adder is configured to use outputs of two modulo units in the modulo circuit as inputs, to obtain a sum of the first baseband signal modulus value and the second baseband signal modulus value obtained after modulo processing performed by the modulo circuit; and, wherein
in the signal decomposition circuit, the lookup table stored in the memory is a one-dimensional lookup table 1DLUT, three such 1DLUTs being stored in the memory, and wherein a sum of the first baseband signal modulus value and the second baseband signal modulus value that is output by the adder is input to each 1DLUT, two of the 1DLUTs are connected to one multiplier each, and an input of each multiplier is an output of the 1DLUT; and
the signal decomposition circuit is configured to:
use an output of the 1DLUT not connected to a multiplier as a fifth signal,
directly output the fifth signal to the modulation circuit,
receive the first baseband signal and the second baseband signal that are input by the DPD components and that are combined into one signal, for each signal combined and from each of the DPD components,
multiply, by the output of one of the 1DLUTs connected to the multipliers, the signal into which the first baseband signal and the second baseband signal are combined, to obtain a sixth signal and a seventh signal, and
output the sixth signal and the seventh signal to the modulation circuit.

12. The transmitter according to claim 1, further comprising: an adder connected to the modulo circuit, wherein the adder is configured to use outputs of two modulo units in the modulo circuit as inputs, to obtain a sum of the baseband signal modulus values obtained after modulo processing performed by the modulo circuit;
in the signal decomposition circuit, the lookup table stored in the memory is a one-dimensional lookup table 1DLUT, one such 1DLUT being stored in the memory, and a sum of the first baseband signal modulus value and the second baseband signal modulus value that is output by the adder is input to the 1DLUT; and, wherein
the signal decomposition circuit is configured to:
use an output of the 1DLUT as a fifth signal,
directly output the fifth signal to the modulation circuit,
receive the first baseband signal and the second baseband signal that are input by the DPD components and that are combined into one signal,
for each signal combined and from each of the DPD components, multiply, by using the multiplier, the sum of the received first baseband signal modulus value and second baseband signal modulus value by the signal into which the first baseband signal and the second baseband signal are combined, to obtain a sixth signal and a seventh signal, and
output the sixth signal and the seventh signal to the modulation circuit.

13. The transmitter according to claim 9, wherein
the modulation circuit comprises: a DAC directly connected to an end of the memory storing the lookup table not connected to the multiplier in the signal decomposition circuit, two DUC components respectively connected to output ends of two multipliers in the signal decomposition circuit, an adder connected to the two DUCs, the other DAC connected to the adder, and an AQM component connected to the other DAC, wherein the lookup table comprises a 1DLUT or a 2DLUT; and
the modulation circuit is configured to:
input, to the dual-band power amplifier, an envelope signal output by the DAC directly connected to the signal decomposition circuit,
perform up-conversion on the sixth signal by using the DUC component to change a frequency of the sixth signal to fc_bandA,
perform up-conversion on the seventh signal by using the other DUC component to change a frequency of the seventh signal to fc_bandB,
add, by using the adder, the seventh signal on which up-conversion processing has been performed to the sixth signal on which up-conversion processing has been performed to obtain a third added signal,
perform digital-to-analog conversion on the third added signal by using the DAC connected to the adder, modulate the third added signal obtained after conversion to a corresponding radio frequency working frequency by using the AQM component, and
input the third added signal to the dual-band power amplifier.

14. The transmitter according to claim 11, wherein
the modulation circuit comprises: a DAC directly connected to an end of the memory storing the lookup table not connected to the multiplier in the signal decomposition circuit, two DUC components respectively connected to output ends of two multipliers in the signal decomposition circuit, an adder connected to the two DUCs, the other DAC connected to the adder, and an AQM component connected to the other DAC, wherein the lookup table comprises a 1DLUT or a 2DLUT; and
the modulation circuit is configured to:
input, to the dual-band power amplifier, an envelope signal output by the DAC directly connected to the signal decomposition circuit,
perform up-conversion on the sixth signal by using the DUC component to change a frequency of the sixth signal to fc_bandA,
perform up-conversion on the seventh signal by using the other DUC component to change a frequency of the seventh signal to fc_bandB, add, by using the adder, the seventh signal on which up-conversion processing has been performed to the sixth signal on which up-conversion processing has been performed to obtain a third added signal,
perform digital-to-analog conversion on the third added signal by using the DAC connected to the adder, modulate the third added signal obtained after conversion to a corresponding radio frequency working frequency by using the AQM component, and
input the third added signal to the dual-band power amplifier.

* * * * *